Aug. 23, 1955  B. BARÉNYI  2,716,040
MOTOR VEHICLE HAVING HINGED END SECTIONS
AND ATTACHED LIFTING MEANS
Filed Jan. 26, 1950
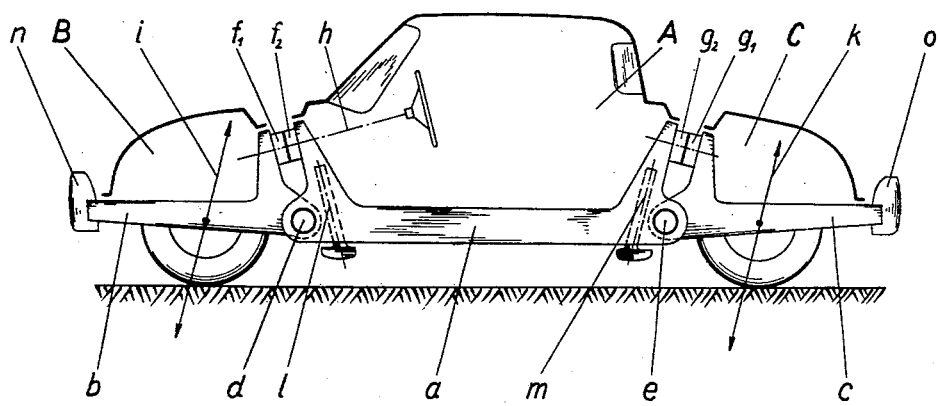
Inventor
Béla Barényi
By Dicke and Padlon
attorneys United States Patent Office 2,716,040
Patented Aug. 23, 1955

2,716,040

MOTOR VEHICLE HAVING HINGED END SECTIONS AND ATTACHED LIFTING MEANS

Béla Barényi, Stuttgart-Rohr, Germany

Application January 26, 1950, Serial No. 140,583

Claims priority, application Germany January 26, 1949

2 Claims. (Cl. 296—28)

This invention relates to a motor vehicle having hinged end sections and attached lifting means. An object of this invention is to provide a motor vehicle with a subdivided chassis and/or body, and in particular to provide a passenger motor car of the structional cell section or multiple compartment type. The primary object of this invention is to simplify the construction and assembly of the vehicle as well as to improve the springing properties of its suspension.

One feature of the invention consists accordingly in that the terminal part of the vehicle, chassis, or body, respectively, which includes one vehicle axle, is linked to the middle part of the vehicle in such a way as to be permitted to pivot about a transverse axis, and sprung against said middle part in the direction of swinging. In particular, the front part together with the front axle, as well as the rear part together with the rear axle are linked to the middle part of the vehicle, chassis or body, respectively, in such a way as to be able to pivot about transverse axes, and sprung against said middle part.

The advantage resulting from a simplified assembly of the parts of the chassis or vehicle is particularly obtained by the fact that it will be sufficient to link the individual parts of the chassis or vehicle at their pivoting centers. Propping in the direction of rotation about the axis of the hinge will then be automatically obtained by the weight of the vehicle parts acting against the propping springs, without necessitating an additional accurate fit of the parts which have to be spring-propped against one another.

A further advantage of the invention consists in that due to the chassis or vehicle parts being linked to, and sprung against, one another, an additional springing action will be obtained resulting for instance in a very soft suspension of the vehicle. At the same time crosscountry riding properties of the vehicle will be considerably improved. Rubber buffers may suitably be used for the spring-propping, the more so as they offer the advantage of being noiseless.

The same as for the assembly, the disassembly of the vehicle is also rendered easier, particularly if jacks are used thereby permitting to jack up the middle part of the vehicle, whereas the wheels will rest on the floor. In that case, the terminal parts of the chassis or vehicle will tilt, relatively to the middle part of the vehicle, about the transverse axis of the hinge which is preferably located in a lower part of the vehicle, whereby the vehicle parts will withdraw from one another at their spring-propping points which will be preferably located in a higher part of the vehicle thereby resulting in a greater accessibility to the connection points as well as to the hinges.

A preferred embodiment of the invention is diagrammatically outlined in the drawing.

The vehicle constructed according to the constructional cell or section method consists of a middle cell A, a front cell B, and a rear cell C. The chassis frame of the vehicle consists, accordingly, of a middle part $a$, a front part $b$, and a rear part $c$. The frame parts, $a$ and $b$, are linked together by a transverse hinge joint or pintles $d$, whereas the frame parts $a$ and $c$, are linked together by a transverse joint $e$. Front part $b$, of the frame, or front part B, of the vehicle, respectively, is so spring-propped against middle part A, as to be able to tilt about axis $d$, e. g., by rubber buffers $f_1$, $f_2$, which press against one another by the action of the weight of the vehicle. Rubber buffers $g_1$, $g_2$, may be provided in the same way for the spring-propping of rear part $c$, of the frame, or of rear part C, of the vehicle, respectively.

Rubber buffers $f_1$, $f_2$, will be of the annular type, thus permitting the control members of steering unit $h$, to pass through them. The wheels moreover are suitably guided and sprung in such a way as to swing in oblique direction, as indicated by arrows $i$ and $k$, with a component acting to the rear when rebounding upward.

To jack up middle cell A, of the vehicle, jacks $l$ and $m$, are provided. They will be arranged as close as possible to joints $d$ and $e$. By operating the jacks, and as soon as they will contact the floor and start raising medium cell A, the two end cells B and C, will tilt relative to medium part A, to the outside around pivots $d$ and $e$, respectively. Tilting may be limited by the front and rear bumpers $n$ and $o$, respectively.

This invention is not limited to the example of embodiment outlined in the foregoing, it rather may be varied at will within the scope of the idea of the invention.

What I claim is:

1. A motor vehicle comprising a middle passenger cell, an end cell separated from said middle cell by a slanting gap, transverse means including a hinge for connecting said end cell with said middle passenger cell, the end cell being connected thereby articulately with respect to said middle cell, said hinge comprising a transverse pintle linking together frame parts of said cells, permitting said cells to be swung apart about said hinge upon upward movement of the middle cell relative to said end cell, and being located in the lower portion of said vehicle, resilient compression members located above said transverse articulate connection for resiliently supporting said cells, and lifting means in said middle cell of the vehicle disposed at the end thereof adjacent said hinge for lifting said middle cell for disconnection thereof from said end cell, said lifting means slanting toward said end part substantially parallel to said gap.

2. A motor vehicle comprising a middle passenger part, a front part and a rear part, transverse means including a front hinge for connecting said front part with said middle passenger part and a rear hinge for connecting said rear part with said middle passenger part, the front part and the rear part of the vehicle being each connected thereby articulately with respect to said middle part, said hinges constituting transverse articulate connections of said parts and being located in the lower portion of said vehicle, resilient compression members located above said transverse articulate connections for resiliently supporting said parts, and lifting means in said middle part of the vehicle disposed at each opposed end thereof adjacent respective hinges for lifting said middle part for disconnection thereof from said end part, the lifting means located near the front end of said middle part slanting forwardly with respect to said vehicle, and the lifting means located near the rear end of said middle part slanting rearwardly with respect to said vehicle.

References Cited in the file of this patent

UNITED STATES PATENTS

Re. 20,171    Curtiss  ----------------  Nov. 17, 1936

(Other references on following page)

UNITED STATES PATENTS

| | | |
|---|---|---|
| 11,042 | Green | June 6, 1854 |
| 2,047,336 | Stout | July 14, 1936 |
| 2,128,930 | Fageol et al. | Sept. 6, 1938 |
| 2,150,073 | Malott | Mar. 7, 1939 |
| 2,177,896 | Lee | Oct. 31, 1939 |
| 2,248,319 | Waterhouse, Jr. | July 8, 1941 |

FOREIGN PATENTS

| | | |
|---|---|---|
| 141,920 | Austria | June 11, 1935 |
| 245,565 | Switzerland | Nov. 17, 1947 |
| 491,383 | Great Britain | Sept. 1, 1938 |
| 507,784 | France | Sept. 23, 1920 |
| 893,936 | France | Nov. 14, 1944 |